United States Patent
Sanchez-Monge et al.

(10) Patent No.: US 12,080,004 B2
(45) Date of Patent: Sep. 3, 2024

(54) RESPONSE NORMALIZATION FOR OVERLAPPED MULTI-IMAGE APPLICATIONS

(71) Applicant: Teledyne FLIR Commercial Systems, Inc., Goleta, CA (US)

(72) Inventors: Enrique Sanchez-Monge, Tampere (FI); Alessandro Foi, Tampere (FI); Michael Kent, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 577 days.

(21) Appl. No.: 17/313,612

(22) Filed: May 6, 2021

(65) Prior Publication Data

US 2021/0279897 A1 Sep. 9, 2021

Related U.S. Application Data

(63) Continuation of application No. PCT/US2019/059938, filed on Nov. 5, 2019.
(Continued)

(51) Int. Cl.
*G06T 7/00* (2017.01)
*G06T 3/40* (2006.01)
(Continued)

(52) U.S. Cl.
CPC ............. *G06T 7/337* (2017.01); *G06T 3/40* (2013.01); *G06T 5/40* (2013.01); *G06T 5/50* (2013.01);
(Continued)

(58) Field of Classification Search
CPC ........... G06T 3/4038; G06T 7/30; G06T 3/40; G06T 7/33; G06T 2200/32;
(Continued)

(56) References Cited

U.S. PATENT DOCUMENTS 6,219,462 B1 * 4/2001 Anandan ............ G06V 10/7515
  382/294
9,224,189 B2 * 12/2015 Liu ........................ G06T 7/33
(Continued)

FOREIGN PATENT DOCUMENTS

CN    102903085 A    1/2013
CN    105574838 A    5/2016
(Continued)

OTHER PUBLICATIONS

Dai, Shaosheng, Changchuan Chen, and Chuanxi Wu. "Non-uniformity correction algorithm for IRFPA based on local scene statistics and improved neural network." 2012 5th International Congress on Image and Signal Processing. IEEE, 2012.*
(Continued)

*Primary Examiner* — Li Liu
(74) *Attorney, Agent, or Firm* — Haynes and Boone, LLP

(57) ABSTRACT

Systems and methods for registration of image pairs, including camera response function normalization are disclosed and include selecting a pair of images from a set of images, each of the pair of images having associated metadata, determining a camera response function for each of the images in the pair of images using the associated metadata, normalizing each camera response function for across the set of images, and applying the normalized camera response function to the pair of images. A deformation map is generated in a multi-scale process using registration parameters, to deform one of the pair of images to align with another of the pair of images. The image pairs may be selected by identifying image pairs having an overlap that exceeds an overlap threshold, having a sequential proximity in an image series satisfying a proximity threshold, and/or having estimated image capture attitudes within an attitude threshold.

20 Claims, 11 Drawing Sheets

Related U.S. Application Data

(60) Provisional application No. 62/756,522, filed on Nov. 6, 2018.

(51) Int. Cl.
| | | |
|---|---|---|
| *G06T 5/40* | (2006.01) | |
| *G06T 5/50* | (2006.01) | |
| *G06T 5/80* | (2024.01) | |
| *G06T 5/90* | (2024.01) | |
| *G06T 7/33* | (2017.01) | |

(52) U.S. Cl.
CPC ............... *G06T 5/80* (2024.01); *G06T 5/90* (2024.01); *G06T 2207/10048* (2013.01); *G06T 2207/20016* (2013.01)

(58) Field of Classification Search
CPC . G06T 2207/10048; G06T 2207/20221; G06T 2207/20016; G06T 3/0068; G06V 10/16
See application file for complete search history.

(56) References Cited

U.S. PATENT DOCUMENTS

| | | | |
|---|---|---|---|
| 9,497,380 B1 | 11/2016 | Jannard et al. | |
| 9,508,117 B1* | 11/2016 | Caber | G06T 7/33 |
| 10,068,317 B2 | 9/2018 | Chen | |
| 2005/0226531 A1* | 10/2005 | Silverstein | G06T 3/00 |
| | | | 382/284 |
| 2010/0266188 A1* | 10/2010 | Burns | G06T 7/30 |
| | | | 382/132 |
| 2010/0296129 A1* | 11/2010 | Zahnert | G06T 7/33 |
| | | | 358/449 |
| 2012/0169842 A1* | 7/2012 | Chuang | H04N 7/181 |
| | | | 348/E7.001 |
| 2013/0208997 A1 | 8/2013 | Liu | |
| 2016/0286137 A1 | 9/2016 | Marks et al. | |
| 2017/0006220 A1* | 1/2017 | Adsumilli | G06V 10/40 |
| 2018/0089855 A1 | 3/2018 | Rodrigues et al. | |
| 2018/0367789 A1* | 12/2018 | Henningsson | G06T 7/97 |
| 2020/0005440 A1* | 1/2020 | Sanchez-Monge | G06T 3/40 |

FOREIGN PATENT DOCUMENTS

| | | |
|---|---|---|
| CN | 105574844 A | 5/2016 |
| CN | 105761233 A | 7/2016 |
| CN | 106296658 A | 1/2017 |
| WO | WO2002/103580 | 12/2002 |
| WO | WO 2015/195317 A1 | 12/2015 |

OTHER PUBLICATIONS

Elibol, Armagan, et al. "Towards automatic identification of mismatched image pairs through loop constraints." Intelligent Robots and Computer Vision XXXI: Algorithms and Techniques. vol. 9025. SPIE, 2014.*

Michael D. Grossberg, Modeling the Space of Camera Response Functions, vol. 26, No. 10, Oct. 2004.

* cited by examiner (a) First image y1

(b) Second image y2

(c) First image y1

(d) Second image y2

(a) First image $y_1$ (y1)

(b) Second image $y_2$ (y2)

(c) Second image registered and CRF normalized $y_2^{\sim p2}$ (y2_iref_reg)

(d) Image support supp$_D$ (indicatorMap) for (c).

(b) Set of pixels sampled randomly from valid area (determined by D).

(a) Indicator Map, or image support $supp_D$ of deformed image.

RESPONSE NORMALIZATION FOR OVERLAPPED MULTI-IMAGE APPLICATIONS

CROSS-REFERENCE TO RELATED APPLICATIONS

This application is a continuation of International Patent Application No. PCT/US2019/059938 filed Nov. 5, 2019 and entitled "RESPONSE NORMALIZATION FOR OVERLAPPED MULTI-IMAGE APPLICATIONS", which is hereby incorporated by reference in its entirety.

International Patent Application No. PCT/US2019/059938 claims priority to and the benefit of U.S. Provisional Patent Application No. 62/756,522 filed Nov. 6, 2018 and entitled "RESPONSE NORMALIZATION FOR OVERLAPPED MULTI-IMAGE APPLICATIONS", which is hereby incorporated by reference in its entirety.

TECHNICAL FIELD

One or more embodiments of the present disclosure relate generally to imaging systems, and more particularly, for example, to systems and methods for combining two or more overlapping images into a dataset.

BACKGROUND

In the field of image processing, there is an ongoing need for efficient and reliable ways to analyze and process images captured by imaging devices. Some systems include one or more image sensors and/or cameras to capture images of one or more fields of view (e.g., image of a scene). In one approach, multiple captured images are aligned and/or stitched together by identifying points in one image that correspond with points in another image. However, different image capture parameters between the image pairs (e.g., camera locations, capture time) can make image registration challenging in certain applications. For example, infrared images captured during an unmanned aerial system (UAS) mission often need to be combined into a single dataset using 2D and/or 3D image registration techniques. A single mission may include 100s of images captured during a time-period of up to 30 minutes. During this time the environmental conditions of the imager may change which can result in images capturing the same features of the scene being sensed at different signal levels even though the scene itself has not changed. These factors may include changes in the temperature of a focal plane array (FPA) used to sense the images, the temperature of the housing and lens assembly, observation distance, observation angles and imager parameter changes (e.g., offset correction). Even though the image capture device itself may be configured to compensate for these changes, the images captured during a flight will not be perfectly normalized.

In view of the foregoing, there is a continued need in the art for improved image registration systems and methods that are both efficient and accurate.

SUMMARY

Various systems and methods are provided for normalizing captured images for use in overlapped multi-image applications, including the normalization of the camera response function. The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

The present disclosure provides improved systems and methods for aligning a pair of images, including novel end-to-end solutions addressing camera response function normalization. Solutions disclosed herein allow for common operations on multiple images at once and are particularly suited for processing infrared images captured during unmanned aerial system (UAS) flights. Infrared images, such as thermal images, can have a different response depending on altitude, difference in environmental conditions during flight, heating up the image capture system, angles of flight, image parameters and other factors. The image capture system may be configured to compensate for these changes during image capture, but the resulting images are not always normalized.

In various embodiments, a camera response function (CRF) normalization process includes an algorithm that applies an offset and gain correction to captured images such that stitching artifacts will be minimized. In some embodiments, the systems and methods disclosed herein are implemented on datasets having at least 50% overlap between consecutive captured frames. Further accuracy is achieved by using images with associated meta data that allows the images to be registered to within 2% of the horizontal and vertical field of view. Optimization criteria includes finding a set of localized gain and offset terms in a frame N such that the pixelwise signal difference in the overlapping area relative to a frame N-1 is minimized.

Figure 1:
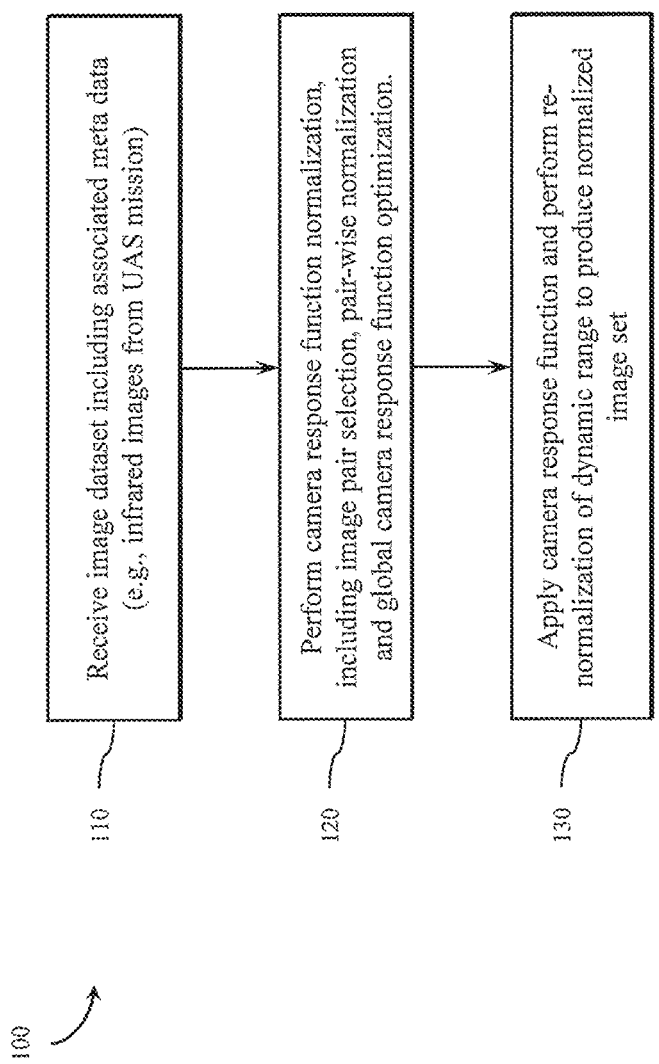
FIG. 1 illustrates an example camera response function normalization process, in accordance with various embodiments of the present disclosure.

Embodiments of an image registration process 100 will now be described with reference to FIG. 1. In step 110, the image pre-registration process receives an image dataset, including associated meta data. In one embodiment, the image dataset includes a collection of infrared images and meta data captured during a UAS mission. For example, calibration data files from drone mapping applications may be used in conjunction with global positioning satellite (GPS) positioning information to accurately estimate the field of view of an image. Images having associated meta data as disclosed herein allows for image registration within 2% of the horizontal and vertical field of view.

In step 120, a camera response function normalization is performed, including image pair selection, pair-wise normalization and global camera response function optimization. In some embodiments, to avoid extreme deformation due to large perspective changes when pairing images, only image pairs where the camera attitude is similar are used. An algorithm reads the calibration files to obtain pair-wise registration parameter of all images in the dataset, using the internal and estimated camera parameters to get a more accurate registration. Next, registration parameters and lens distortion parameters are obtained. The registration parameters may include parameters for approximately aligning each overlapping pair of images (e.g., translation, rotation, and scaling, or more general perspective transformations). In one embodiment, the registration parameters are embodied in a two-dimensional array with the registration parameters for every possible pair of images. For N images, for example, the registration parameters are contained in an array of N×N elements, such that registration parameter {i,j} gives the registration parameters (translation, rotation and scaling) for aligning image j with image i. The lens distortion parameters include estimated lens distortion parameters for the image capture device. In step 130, the camera response functions are applied, and the image set is re-normalized to (approximately) the original dynamic range.

Figure 2:
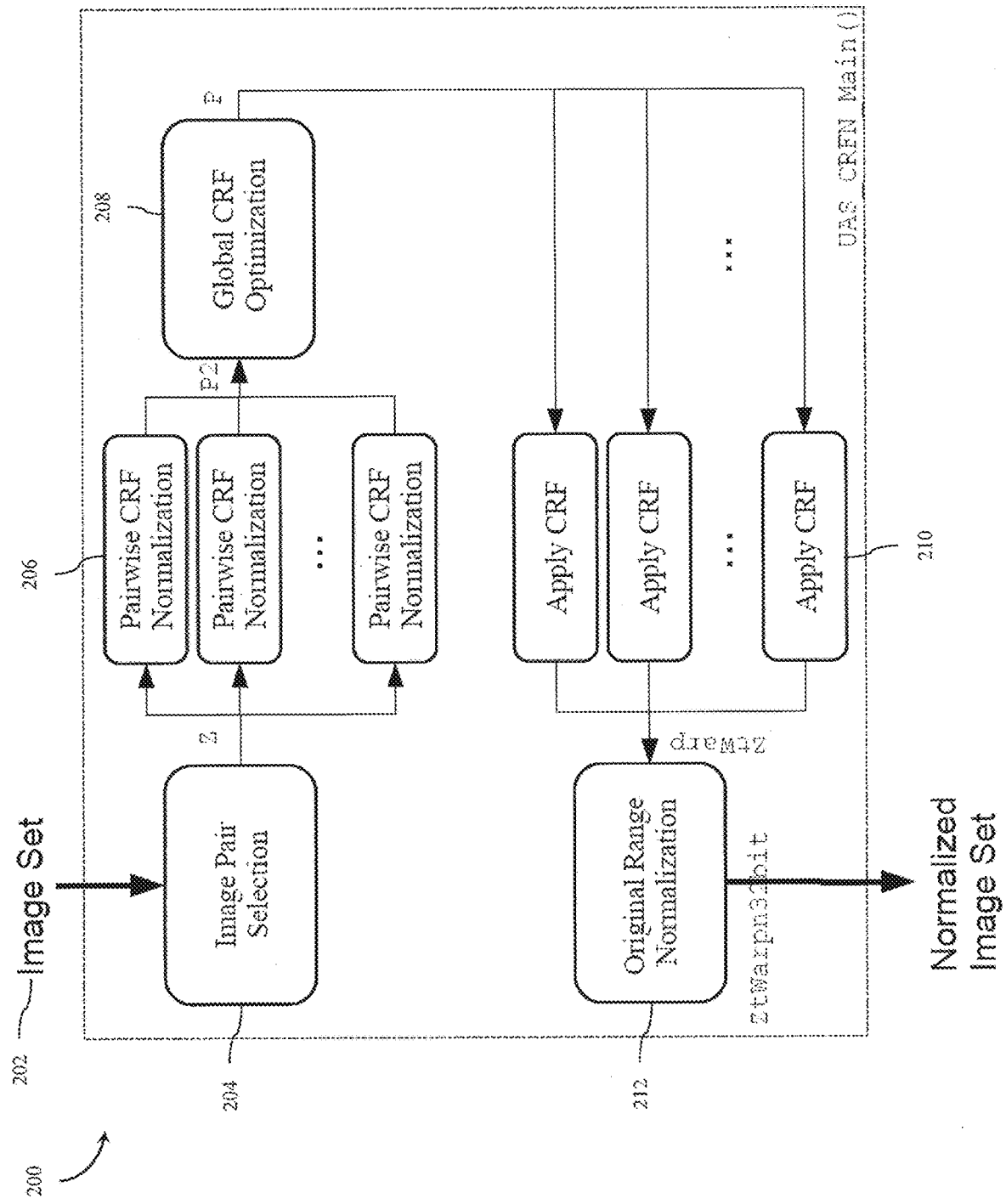
FIG. 2 illustrates an example camera response function normalization process, in accordance with various embodiments of the present disclosure.

Embodiments of a camera response function normalization algorithm 200 will now be further described with reference to FIG. 2. An image set 202 is provided and image pairs are selected in step 204. The image set 202 includes a set of overlapping images together with a set of registration parameters which allows the correct alignment (e.g., with an error up to 2% of FOV in some implementations) of any pair of overlapping images. In some embodiments, image pair requirements are set by defining a minimum acceptable overlap of image pairs (e.g., 0.6 or 60%). The algorithm will then select only the image pairs that have at least a minimum overlap percent of the image area overlapping. The image pair selection may be further constrained by defining a maximum percentage of image pairs of non-consecutive images. The total maximum possible number of pairs is defined as N×(1+non-sequential percentage) wherein N is the number of sequential image pairs. The image pair selection algorithm selects from the image set all the suitable image pairs based on the pre-registration parameters. This includes computing the overlap between all possible image pairs and selecting those image pairs meeting the requirements. Consecutive image pairs are selected first. Next, more image pairs are selected by finding overlapping images taken non-sequentially (i.e. further in time along the path). The image pair indexes are encoded in an array/pairing matrix.

In step 206, each selected image pair is processed independently to match the camera response function (CRF) of the two images in each pair. The goal of the pair-wise normalization is to register and normalize the second image of each pair $y_2$ so that its CRF matches that of the first image in the pair $y_1$. After the pairwise CRFs are obtained, a global CRF optimization 208 is performed to ensure that every image appearing in several pairs will have the same response function, thus every element n the scene covered by different images will have a similar radiometric value in each of the images. After the global optimization of the CRFs, the optimized CRFs are applied to the set of images in step 210. Next, the dynamic range of the images is converted to try to match the original dynamic range while preserving the optimized CRFs, in step 212.

Figure 3:
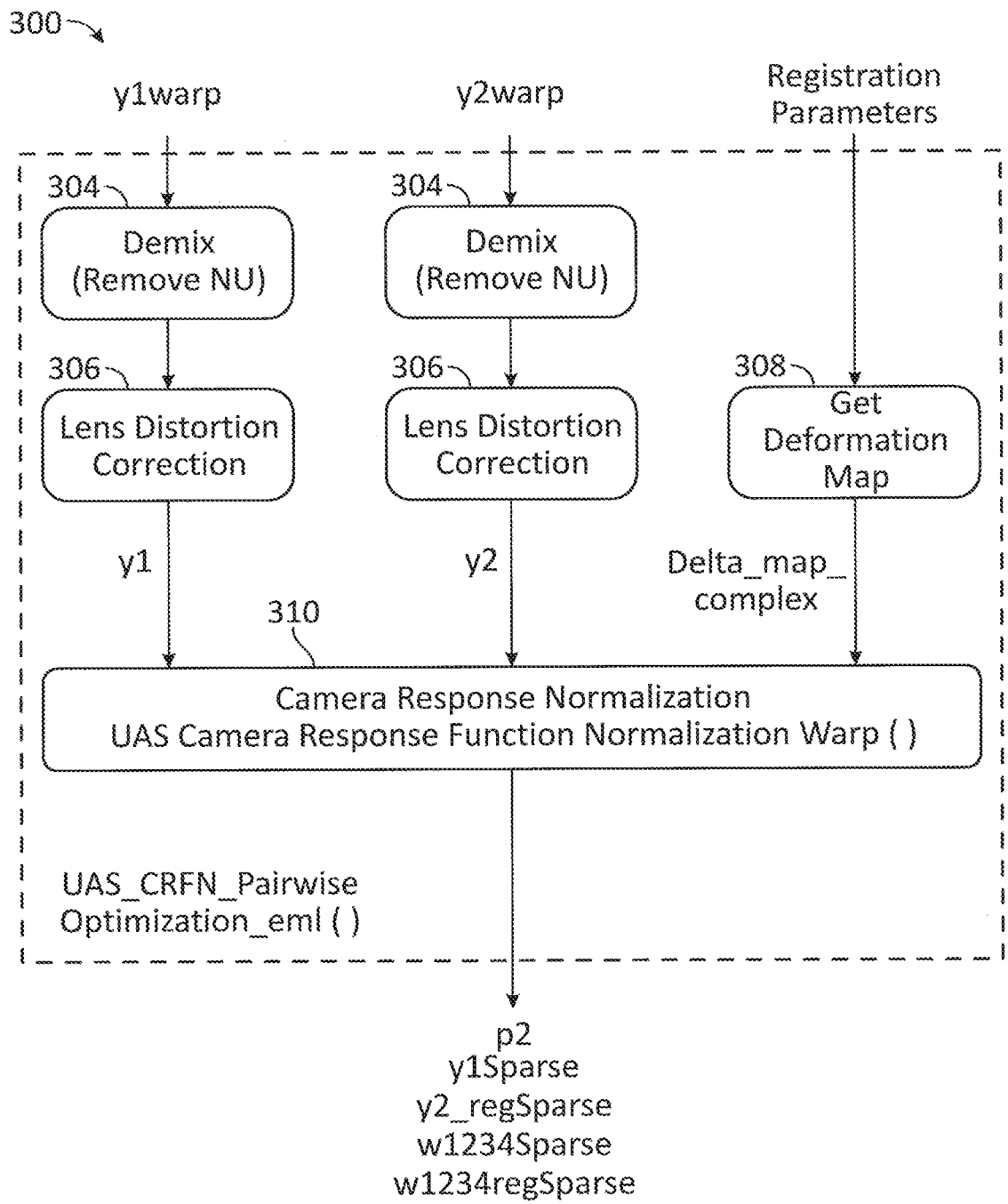
FIG. 3 illustrates an example flow chart of a camera response function normalization algorithm, in accordance with various embodiments of the present disclosure.

Referring to FIG. 3, an embodiment of a processing method 300 applied to each image pair (y1,y2) in step 206 of FIG. 2 will now be described. First, in a pre-processing stage, low-frequency non-uniformity is removed from the received image pair (y1warp and y2warp) through demixing component 304. In one embodiment, the demixing component may be implemented using an embodiment of the low frequency, non-uniformity removal method disclosed in international application number PCT/US2018/022495, filed Mar. 14, 2018, and titled "Systems and methods for reducing low-frequency non-uniformity in images," which is hereby incorporated by reference in its entirety. Next, in step 306, lens distortion correction is applied using appropriate lens distortion parameters corresponding to components of the image capture device. Additionally, using the registration parameters, a deformation map (delta_map_complex) is created in step 308, which is used to deform the second image, y2, to align with the first image, y1, in the pair. In various embodiments, the deformation map is a complex 2D array used for aligning y2 with respect to y1. For each pixel in y2 the corresponding value in the deformation map tells the displacement of that pixel to align to the corresponding pixel in y1. In one embodiment, the real part of the value corresponds to the horizontal displacement while the imaginary part corresponds to the vertical displacement.

Camera response normalization (CRN) is performed in step 310. In this step, the image pair (y1,y2) and the deformation map are input and a CRF matching the second image, y2, in the pair with the first image, y1, in the pair is estimated. In various embodiments, the CRN process 310 also receives weights $w_k$, for k=1, 2, 3, 4 for interpolation of the CRF as discussed further below. The camera response normalization process 310 outputs parameters p2 for mapping the CRF of the second image to match the CRF of the first image. Additionally, from each of the image pairs a set of randomly sampled points is selected for use in global optimization (disclosed below), including a set of random sampling points extracted from the first image (y1Sparse) and a corresponding sampling points from the second image that are registered with the respect to the first image (y2_regSparse). Weights for the interpolation of the CRF for the sampled points in the first image (w1234Sparse), and weights for the interpolation of the CRF for the sampled points in the registered second image (w1234regSparse) are also output.

Figure 4:
FIG. 4 illustrates example image pairs with different camera response functions, in accordance with various embodiments of the present disclosure.
Figure 4:
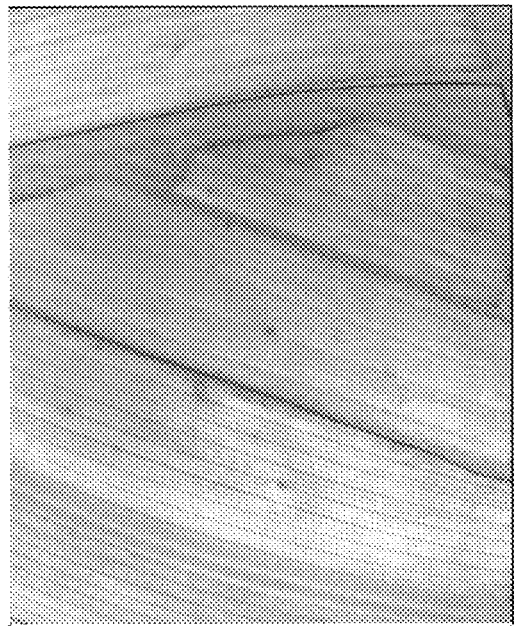
Figure 4:
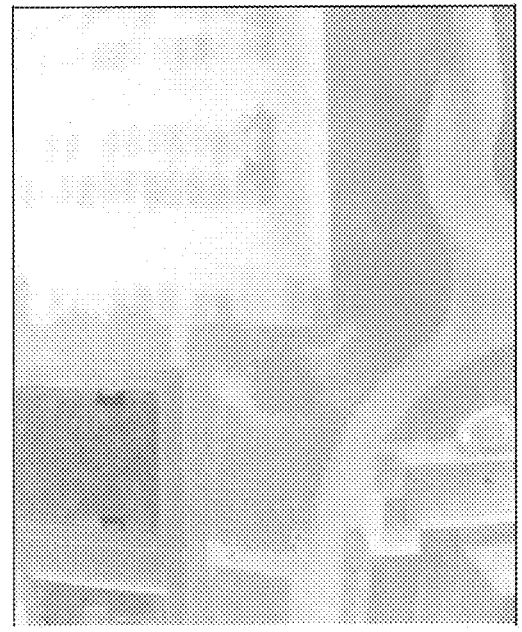
Figure 4:
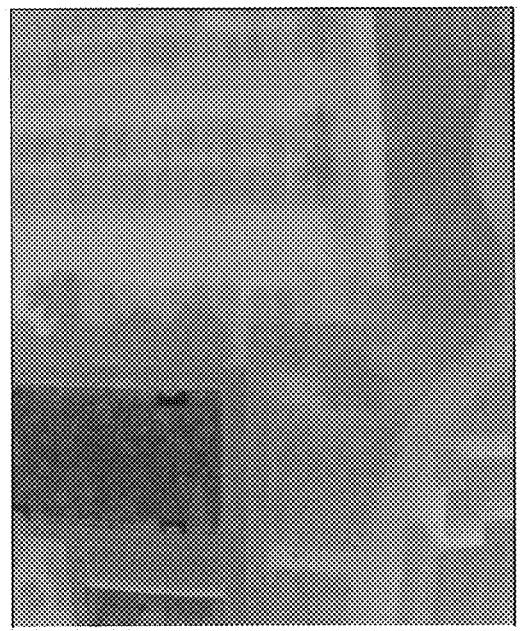

FIG. 4 illustrates two examples, (a)-(b) and (c)-(d), of image pairs with different CRFs. The image pairs show the changes in the CRF in different areas of the image. The camera response function is modified by applying a parametric transformation on the image. Due to the non-uniformity present in the images the camera response function is non-global. In various embodiments, therefore, four different transformation functions for the CRF are defined at the corners of each image.

In this manner, the CRF in every pixel of the image is transformed by interpolation of four different affine transform functions $P_{p_2}(c, r)$, each one anchored in one of the corners of the image. The transformed image $y_2^{p_2}$ is then defined below in Equation (1) as:

$$y_2^{p_2} = P_{p_2}(y_2) = w_1 P_{p_2}^{(0,0)}(y_2) + w_2 P_{p_2}^{(0,1)}(y_2) + w_3 P_{p_2}^{(1,0)}(y_2) + w_4 P_{p_2}^{(1,1)}(y_2)$$

where $p_2^{(0,0)}$, $p_2^{(0,1)}$, $p_2^{(1,0)}$, $p_2^{(0,1)}$, are affine transformation parameters defined at each of the corners of image $y_2$ as show in Equation (2):

$$P_{p_2}^{(c,r)}(y_2) = p_2^{(c,r)}(1) + p_2^{(c,r)}(2) \cdot y_2$$

Figure 5:
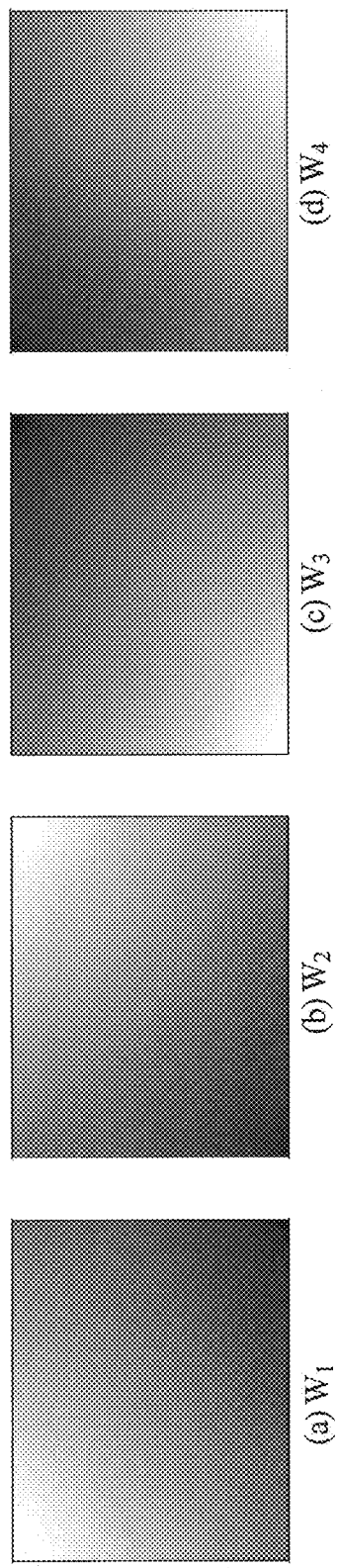
FIG. 5 illustrates example weight functions, in accordance with various embodiments of the present disclosure.

The weight functions $w_k$ of the different CRFs are pre-computed as an initial step, as shown in FIG. 5. They are defined pixel-wise by the Euclidean distance of each pixel (i,j) to each of the four corners of the image, as shown in Equation (3):

$$w_k(i, j) = 1 - \frac{\sqrt{(i - c_k)^2 + (j - r_k)^2}}{\sqrt{2}}$$

where $(c_k, r_k)$ for k=1, 2, 3, 4 are the coordinates of the four corners of the image.

Figure 6:
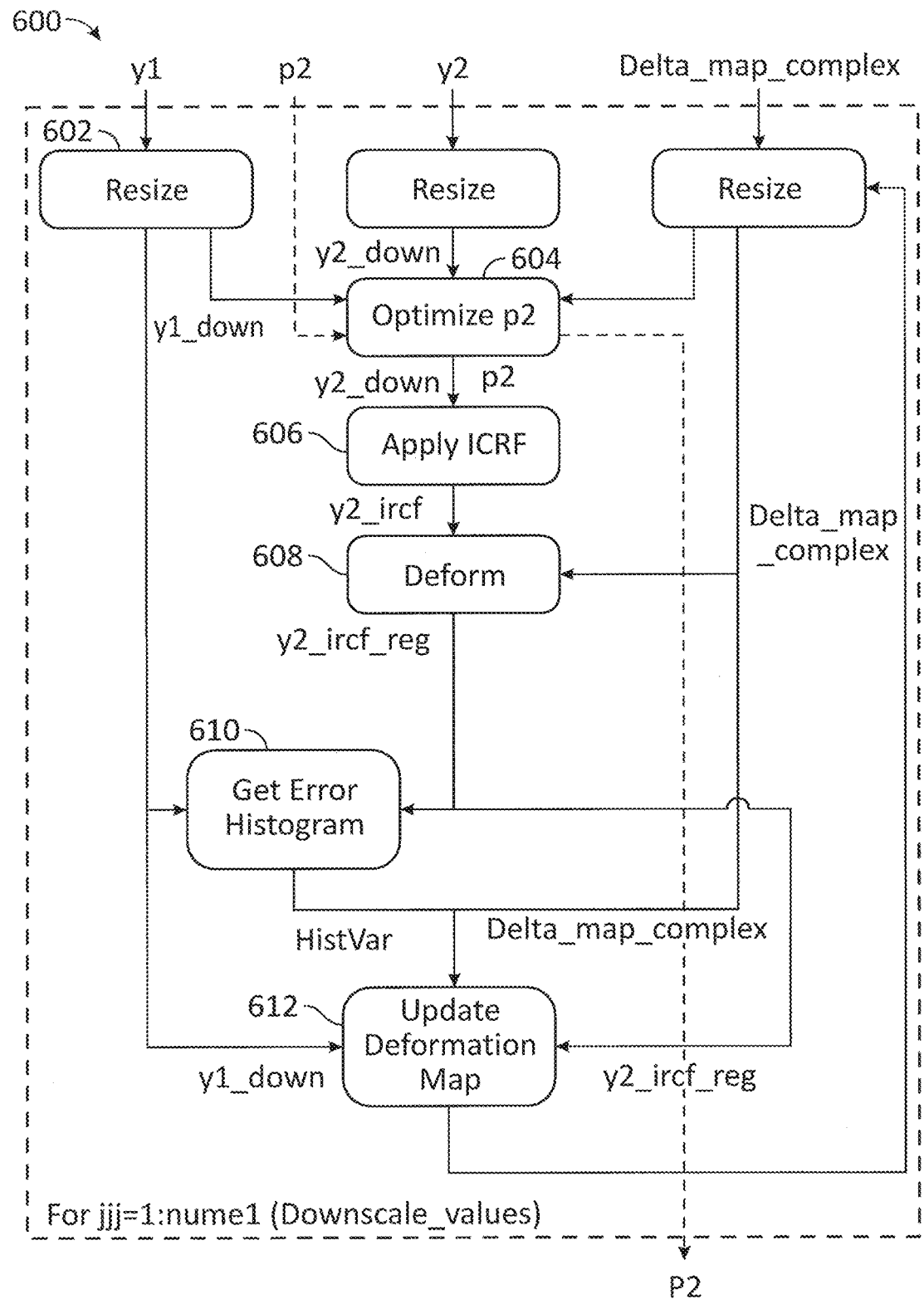
FIG. 6 illustrates an example flow chart of camera response function normalization algorithm, in accordance with various embodiments of the present disclosure.

An embodiment of an image pair camera response function normalization algorithm 600 will now be described with reference to FIG. 6. The algorithm 600 works on an iterative multi-scale manner, where in each iteration the deformation map (delta_map_complex) aligning the second image $y_2$ with respect to the first image $y_1$ is refined. In each iteration the images and deformation map are resized/downsampled (step 602), the transformation parameters $p_2$ are optimized for the resized images (step 604), the new camera response resource function is applied (step 606), the downsampled image $y_2$ is deformed (step 608). In step 610, error histograms are determined to identify areas in which the images have a higher error in the CRF to assign less weight. Finally, in step 612, the deformation map is updated.

The algorithm 600 optimizes the transformation parameters $p_2$ that transform the CRF of image $y_2$ to match that of image $y_1$. The deformation D registering $y_2$ to $y_1$ is determined by the deformation map (delta_map_complex). Together with the alignment refinement, the transformation parameters $p_2$ matching the CRF of the second image to the CRF of the first image are optimized.

In various embodiments, the goal is to minimize the $l_1$ discrepancy between $y_1$ and the transformed and registered image $\tilde{y}_2^{p_2}$ over their overlapping area, as shown in Equation (4):

$$p_2 = \arg\min_{p_2} \left\{ \frac{|y_1 - \tilde{y}_2^{p_2}|_1}{std_{supp_D}(y_1) + std_{supp_D}(\tilde{y}_2^{p_2})} + \lambda \left( O_h(y_1) + O_h(\tilde{y}_2^{p_2}) + O_\mu(y_1, \tilde{y}_2^{p_2}) + O_\sigma(y_1, \tilde{y}_2^{p_2}) \right) \right\}$$

where $\tilde{y}_2^{p_2} = D(P_{p_2}(y_2))$ is the second image $y_2$ where the camera response function has been corrected with transformation $P_{p_2}$ and the deformation operation D have been applied to match image $y_1$, and $std_{supp_D}(y_*)$ is the estimated standard deviation of image $y_*$ over the support of deformation operator D. The loss function in Equation (4) includes four penalty terms $O_*$ designed to keep the inputs close to a uniform distribution u(0,1). The first two penalty terms are designed to penalize the deviation from a uniform distribution u(0,1) attempting to equalize the two histograms of $y_1$ and $\tilde{y}_2^{p_2}$, as shown in Equation (5):

$$O_h(y) = \sum_{i,j \in supp_D} \left| 1 - \frac{\nabla(S(y)) \cdot \#D}{\max(y) - \min(y)} \right|$$

where S is a pixel intensity sorting operator, $\nabla$ a gradient operator, $supp_D$ and #D are respectively the support and its cardinality of deformation operation D. Additionally, Equation (6) as shown below, $$O_\mu(y, \tilde{y}_2^{p_2}) = 0.1 \left( \sum_{i,j \in supp_D} \frac{y_1 - \tilde{y}_2^{p_2}}{\#D} - 1 \right)^2$$

penalizes the mean of $y_1$ and $\tilde{y}_2^{p_2}$ to be close to 0.5 (mean of a uniform distribution u(0,1)), and Equation (7), as shown below, $$O_\sigma(y, \tilde{y}_2^{p_2}) = 0.1 \left( std_{supp_D}(y_1 + \tilde{y}_2^{p_2}) - \frac{2}{\sqrt{12}} \right)^2$$

penalizes the standard deviation of the inputs $y_1$ and $\tilde{y}_2^{p_2}$ to be close to $1/\sqrt{12}$ (standard deviation of a uniform distribution u(0,1)). The strength of the penalty terms is controlled by $\lambda$, as shown in Equation (8), below:

$$\lambda = \mu \frac{0.6745 \sqrt{\sigma_1^2 + \sigma_2^2}}{std_{supp_D}(y_1) + std_{supp_D}(y_2)}$$

where $\mu = 1/5$, $\sigma_1 = 0.004$ and $\sigma_2 = 0.004$ are the standard deviation of the noise added to the original images for regularization purposes.

The deformation map (delta_map_complex) is updated in each iteration. This is done by using a gradient based method that estimates a pixelwise displacement between the two images. Weighted 2D polynomial fitting is used for this purpose. As mismatches in the CRFs of both images affects the gradients, a histogram of errors is used (histVar) to get in which areas we have a higher error in the CRF to assign less weight in the displacement estimation. Other methods, such as optical flow estimation, may be used in other embodiments.

Figure 7:
FIG. 7 illustrates example image pair camera response function normalization, in accordance with various embodiments of the present disclosure.
Figure 7:
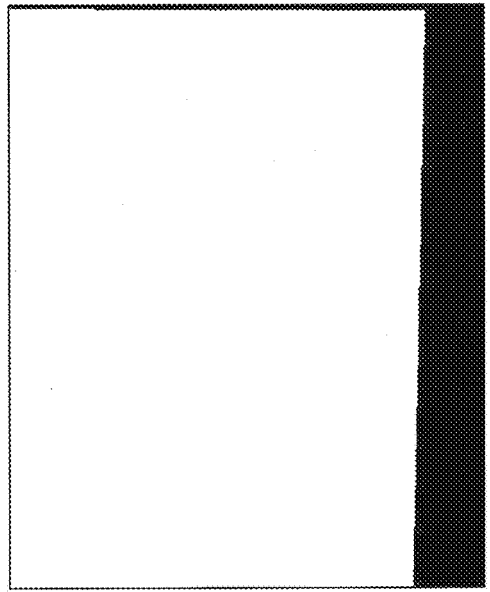
Figure 7:
Figure 7:

Referring to FIG. 7, image pair CRF normalization is illustrated. The original pair (a) and (b) show different CRF. In (c) the CRF of $y_2$ is optimized to match that of the first image $y_1$.

Global CRF optimization (block 208 of FIG. 2) will now be described with reference to FIG. 8. From the pairwise optimization stage the algorithm saves a set of sampling points extracted from the registered pair of images, the corresponding corner CRF polynomials, and the weights for interpolating the CRFs at the sampling points. The pairwise CRF are obtained independently and for every pair of images the second image is normalized to match the first image. In the global optimization of the camera response functions, it is ensured that for every processed image, the CRF parameters are the same in all the pairs it belongs to. The global optimization algorithm receives a set of random sampling points Y1p extracted from the first image, for all pairs, and a set of sampling points Y2p from the second image registered with respect to the first image for all pairs. The algorithm also received weights W1234_1 for the interpolation of the CRF for the sampled points in the first image for all pairs, and weights W1234_2 for the interpolation of the CRF for the sampled points in the registered second image, for all pairs. The algorithm also receives parameters P2 for mapping the CRFs of the second image from every pair to match the CRF of the first image in the pair, and a binary pairing matrix indexing the image pairs.

The global optimization algorithm first uses the sampling points to estimate the average intensity of the images, and then enforces all images to have the same average intensity value. Then, as every image will appear in one or more image pairs, a success indicator for each pairwise CRF normalization is calculated by the mean of absolute differences between the sampling points in the pair. To ensure that for every processed image, the CRF parameters are the same in all the pairs it belongs to, the success indicator is used a as weight in a weighted average for all the CRF parameters estimated for the image. The result of the weighted average is then used as the CRF for that concrete image. The global optimization returns a unique set of CRF transformation parameters P for every image that can be used to normalize the image set.

Figure 8:
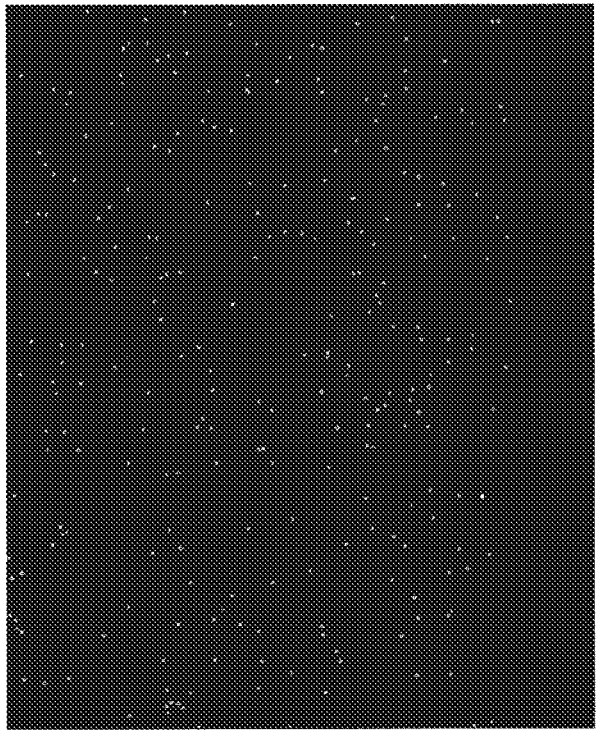
FIG. 8 illustrates an example indicator map and set of randomly sampled pixels, in accordance with various embodiments of the present disclosure.
Figure 8:

As illustrated in FIG. 8, in image (a) the image support (indicatorMap) is determined by the deformation operator D. In (b) after the pairwise optimization, a set of randomly sampled points are extracted from $y_1$ and $\tilde{y}_2^{P2}$ from the support area determined by D.

Figure 9:
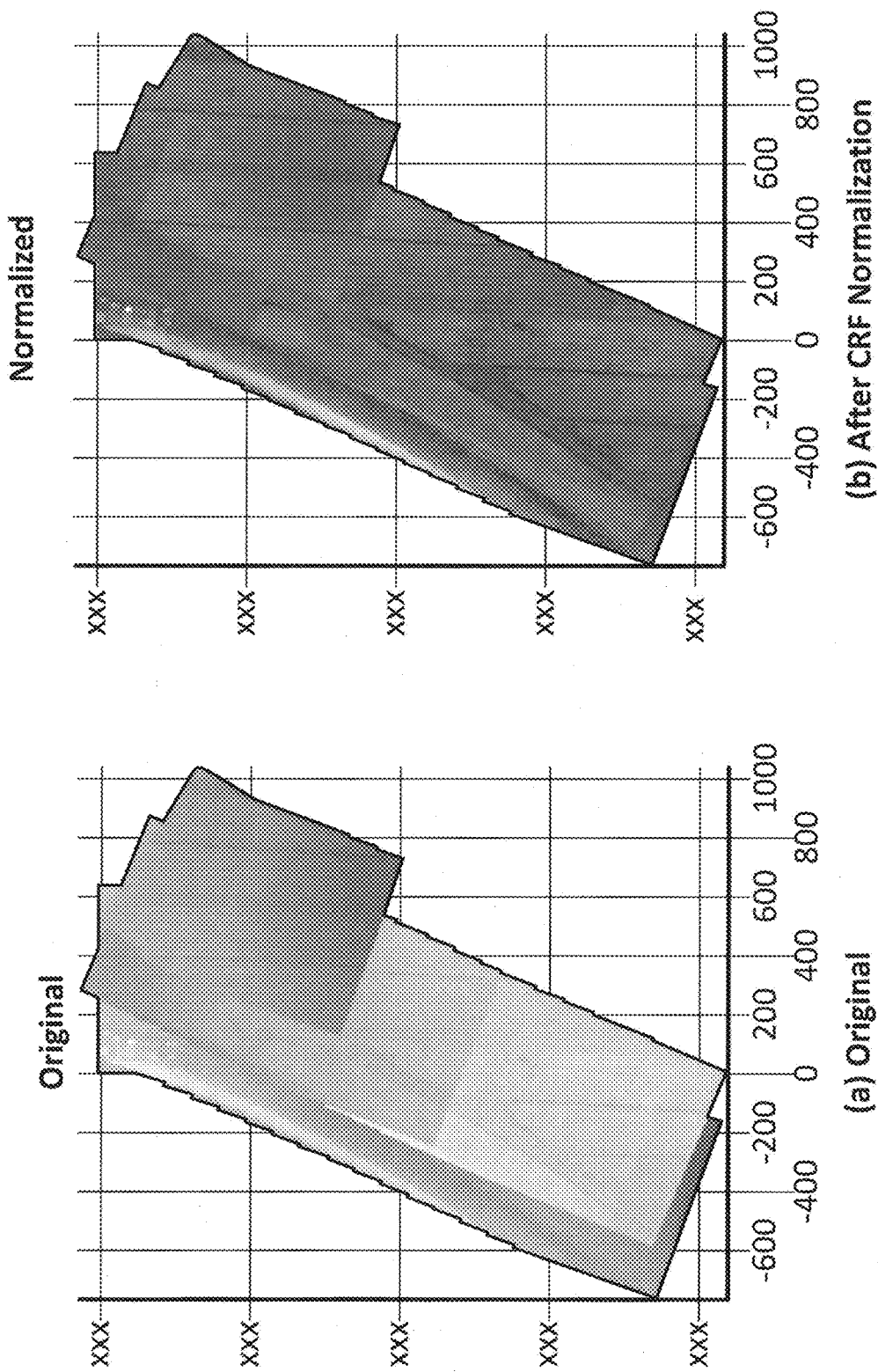
FIG. 9 illustrates an example image before and after camera response function normalization, in accordance with various embodiments of the present disclosure.

Referring to FIG. 9, a process for applying the camera response function and re-normalization of dynamic range (see steps 210 and 212 of FIG. 2) will now be described. After the global CRF optimization, those images belonging to the valid image pairs are transformed so their CRF match using the transformation values stored in P. After the CRFs have been normalized for the image set, their dynamic range is converted back to its original values (or as close as possible to the original dynamic range). For this, the original maximum and minimum values over the valid image set is found and then used to scale the normalized images. FIG. 9 illustrates example results of the algorithm. Image (a) is the original image and image (b) is the image after CRF normalization.

Example implementations of a registration systems and methods including embodiments of the camera response normalization disclosed herein will now be described with reference to FIGS. 10 & 11. In various embodiments, a system for registration of a series of image includes an image capture device, such as a camera operable to capture a series of images, and a host system operable to receive a stream of image pairs and perform the registration and normalization process as disclosed herein. In one embodiment, the host system includes a plurality of templates that may be selected allowing the registration process to be adapted for use with various image capture systems.

Figure 10:
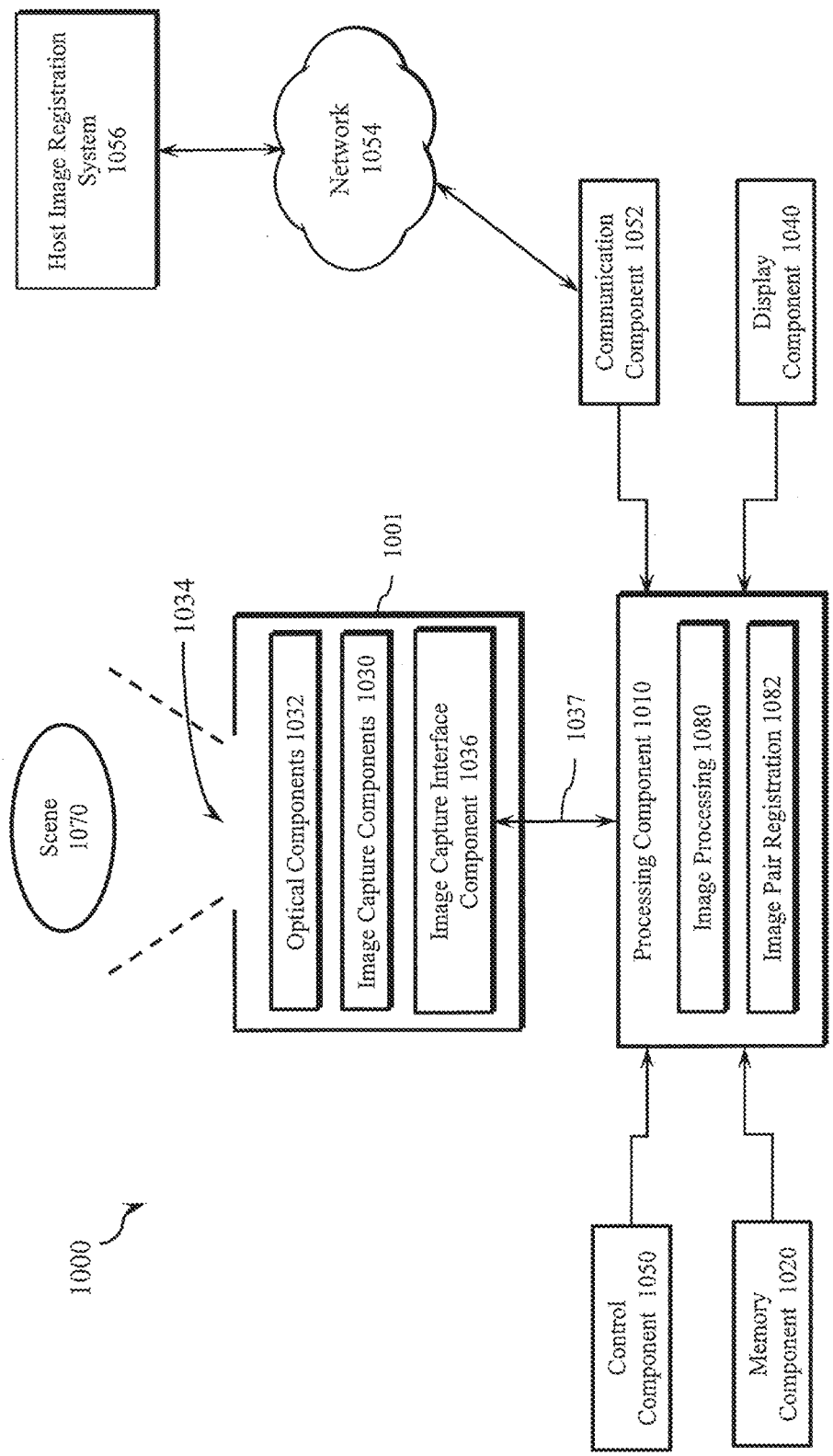
FIG. 10 illustrates an example imaging system, in accordance with various embodiments of the present disclosure.

Referring to FIG. 10, embodiments of an image capture system 1000 for use with an image registration host system will now be described. In some implementations, the image capture device is part of a multi-spectral imaging system that can capture and process both visible and infrared images. In various applications, it is desired to align the pair of captured images on top of one another. For example, object detection may be performed on multiple images and the results combined to achieve more accurate object detection. In some embodiments, the systems and methods disclosed herein are configured to automatically align image pairs.

In various embodiments, the image capture system 1000 may be implemented in an unmanned aerial system (UAS), including an unmanned aerial vehicle (UAV) or drone operable to capture infrared images during flight. The UAS may comprises a standalone system that includes the host system and/or a distributed system that may include image processing and image registration on a cloud or other network server system. In various embodiments, after the UAV returns from a mission the images are transferred to a host system for alignment and analysis, including camera response normalization as disclosed herein. In some embodiments, a series of infrared images captured during a UAS mission may need to be combined into a single dataset using 2D and/or 3D image registration techniques. A single mission may consist of 100s of images captured during a time-period of up to 30 minutes. During this time the environmental conditions of the image capture components may change which can result in images capturing the same features of the scene being sensed at different signal levels even though the scene itself has not changed. The image registration process disclosed herein may be used to align infrared image pairs (or other image pairs captured using different modalities) for use in further image processing.

The image capture system 1000 may be an imaging system used, for example, to capture and process images to detect, classify and/or count objects that appear in a field of view, map terrain and physical structures and/or perform other image capture and processing functions. As illustrated, the image capture system 1000 may be used for imaging a scene 1070 in a field of view. The image capture system 1000 includes a processing component 1010, a memory component 1020, image capture components 1030, optical components 1032 (e.g., one or more lenses configured to receive electromagnetic radiation through an aperture 1034 in camera component 1001 and pass the electromagnetic radiation to image capture component 1030), an image capture interface component 1036, an optional display component 1040, a control component 1050, a communication component 1052, and other sensing components.

In various embodiments, image capture system 1000 may be implemented as an imaging device, such as camera component 1001, to capture image frames, for example, of the scene 1070 in the field of view of camera component 1001. In some embodiments, camera component 1001 may include image capture components 1030, optical components 1032, and image capture interface component 1036 housed in a protective enclosure. Image capture system 1000 may represent any type of camera system that is adapted to image the scene 1070 and provide associated image data. The image capture system 1000 may be implemented with camera component 1001 at various types of fixed locations and environments, or in a portable device or vehicle (e.g., a manned and/or unmanned land-based vehicle, watercraft, aircraft, spacecraft, or another vehicle).

Processing component 1010 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), a graphics processing unit and/or any other appropriate combination of processing device and/or memory to execute instructions to perform any of the various operations described herein. Processing component 1010 is adapted to interface and communicate with components 1020, 1030, 1040, and 1050 to perform method and processing steps as described herein. Processing component 1010 may also be adapted to perform image processing (image processing component 1080) and/or image pair registration (image pair registration component 1082) as described herein. In various embodiments, the processing component 1010 may also be adapted to detect and classify objects in the images captured by the image capture components 1030, through image processing component 1080.

It should be appreciated that processing operations and/or instructions may be integrated in software and/or hardware as part of processing component 1010, or code (e.g., software or configuration data) which may be stored in memory component 1020. Embodiments of processing operations and/or instructions disclosed herein may be stored by a machine-readable medium in a non-transitory manner (e.g., a memory, a hard drive, a compact disk, a digital video disk, or a flash memory) to be executed by one or more computers (e.g., logic or processor-based system) to perform various methods disclosed herein.

Memory component 1020 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 1010 is adapted to execute software stored in memory component 1020 and/or a machine-readable medium to perform various methods, processes, and operations in a manner as described herein.

Image capture components 1030 include, in one embodiment, one or more sensors for capturing image signals representative of an image, of scene 1070. In one embodiment, the sensors of image capture components 1030 provide for representing (e.g., converting) a captured infrared image signal of scene 1070 as digital data (e.g., via an analog-to-digital converter included as part of the sensor or separate from the sensor as part of image capture system 1000). In some embodiments, the image capture components 1030 include infrared sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired. Infrared sensors may be implemented, for example, as microbolometers or other types of thermal imaging infrared sensors arranged in any desired array pattern to provide a plurality of pixels. In some embodiments, the image capture components 1030 also include visible spectrum sensors configured to detect visible spectrum radiation from a target scene 1070.

Processing component 1010 may be adapted to receive image signals from image capture components 1030, process image signals (e.g., to provide processed image data), store image signals or image data in memory component 1020, and/or retrieve stored image signals from memory component 1020. In various aspects, processing component 1010 may be remotely positioned, and processing component 1010 may be adapted to remotely receive image signals from image capture components 1030 via wired or wireless communication with image capture interface component 1036, as described herein.

Display component 1040 may include an image display device (e.g., a liquid crystal display (LCD)) or various other types of generally known video displays or monitors. Control component 1050 may include, in various embodiments, a user input and/or interface device, such as a keyboard, a control panel unit, a graphical user interface, or other user input/output. Control component 1050 may be adapted to be integrated as part of display component 1040 to operate as both a user input device and a display device, such as, for example, a touch screen device adapted to receive input signals from a user touching different parts of the display screen.

Processing component 1010 may be adapted to communicate with image capture interface component 1036 (e.g., by receiving data and information from image capture component 1030). Image capture interface component 1036 may be configured to receive image signals (e.g., image frames) from image capture components 1030 and communicate image signals to processing component 1010 directly or through one or more wired or wireless communication components (e.g., represented by connection 1037) in the manner of communication component 1052. Camera component 1001 and processing component 1010 may be positioned proximate to or remote from each other in various embodiments.

In one embodiment, communication component 1052 may be implemented as a network interface component adapted for communication with a network and may include one or more wired or wireless communication components. In various embodiments, a network 1054 may be implemented as a single network or a combination of multiple networks, and may include a wired or wireless network, including a wireless local area network, a wide area network, the Internet, a cloud network service, and/or other appropriate types of communication networks. The image capture system 1000 may be configured to operate with one or more computing devices, servers and/or one or more databases, and may be combined with other components. In some embodiments, image capture system 1000 may send image pairs over network 1054 (e.g., the Internet or the cloud) to a server system, such as host registration system 1056, for remote image pair registrations and processing, including camera response normalization, as disclosed herein.

Figure 11:
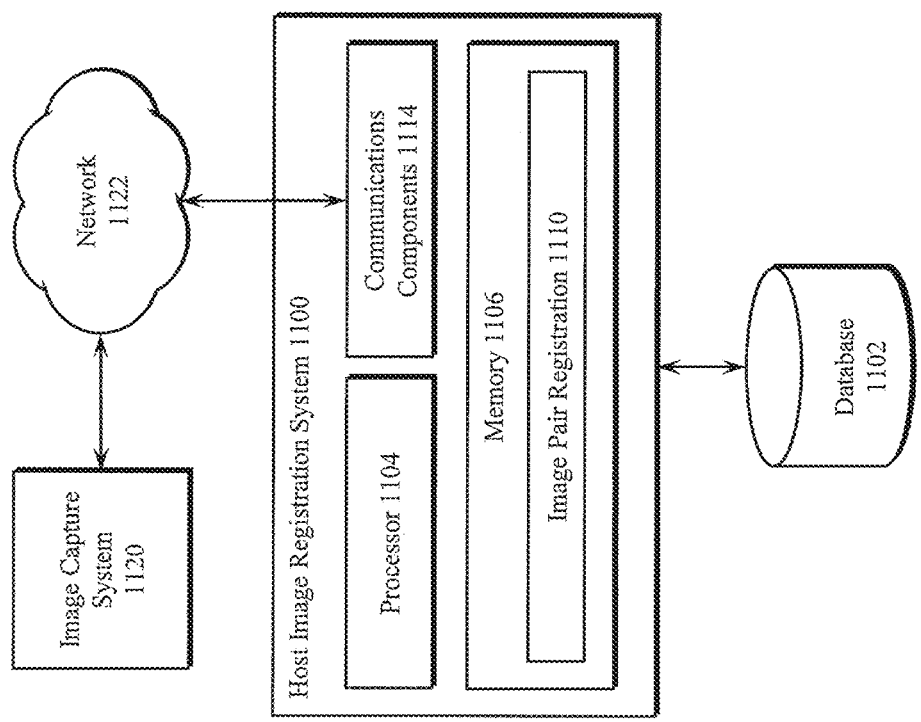
FIG. 11 illustrates an example host image registration system, in accordance with embodiments of the present disclosure.

Referring to FIG. 11, various embodiments of a host image registration system 1100 will now be described. The host image registration system 1100 may be implemented on one or more servers such as an application server that performs data processing and/or other software execution operations for generating, storing, classifying and retrieving images. In some embodiments, the components of the host image registration system 1100 may be distributed across a communications network, such as communications network 1122. The communications network 1122 may include one or more local networks such as a wireless local area network (WLAN), wide area networks such as the Internet, and other wired or wireless communications paths suitable for facilitating communications between components as described herein. The host image registration system 1100 includes communications components 1114 operable to facilitate communications with one or more image capture systems 1120 over the communications network 1122.

In various embodiments, the host image registration system 1100 may operate as a general-purpose image registration system, such as a cloud-based image registration system, or may be configured to operate in a dedicated system, such as a video surveillance system that stores video and images captured in real time from a plurality of image capture devices and identifies and classifies objects using a database 1102. The host image registration system 1100 may be configured to receive one or more image pairs (e.g., pairs from a stream of images captured from an infrared camera of a video surveillance system) from one or more image capture systems 1120 and process associated registration requests.

As illustrated, the host image registration system 1100 includes one or more processors 1104 that perform data processing and/or other software execution operations for the host image registration system 1100. The processor 1104 may include logic devices, microcontrollers, processors, application specific integrated circuits (ASICs), field programmable gate arrays (FPGAs) or other devices that may be used by the host image registration system 1100 to execute appropriate instructions, such as software instructions stored in memory 1106, including image pair co-registration component 1110 and/or other applications. The memory 1106 may be implemented in one or more memory devices (e.g., memory components) that store executable instructions, data and information, including image data, video data, audio data, and network information. In various embodiments, the host image registration system 1100 may be configured to interface with various network devices, such as an image capture system 1120, desktop computer or network server, a mobile computing device such as a mobile phone, tablet, laptop computer or other computing device having communications circuitry (e.g., wireless communications circuitry or wired communications circuitry) for connecting with the host image registration system 1100.

The communications components 1114 may include circuitry for communicating with other devices using various communications protocols. In various embodiments, communications components 1114 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 1114 may be further configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications components 1114.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
identifying a plurality of image pairs from a set of images, each image pair comprising a first image selected from the set of images and a second image selected from the set of images that satisfies image registration criteria with the first image;
determining, separately for each of the image pairs, a normalized camera response function for each of the images in the image pair;
generating an optimized normalized camera response function for each image of the set of images by optimizing the normalized camera response functions determined for two or more image pairs that include the image; and
applying, for each image in the set of images, the optimized normalized camera response function.

2. The method of claim 1, wherein the plurality of image pairs are infrared images.

3. The method of claim 1, further comprising normalizing a dynamic range of each of the plurality of image pairs.

4. The method of claim 1, further comprising applying at least one lens distortion parameter corresponding to components of an image capture device to each image of the set of images.

5. The method of claim 1, further comprising demixing each of the plurality of image pairs to remove low-frequency non-uniformity.

6. The method of claim 1, further comprising creating a deformation map using registration parameters, wherein the deformation map is used to align the second image with the first image.

7. The method of claim 6, wherein creating the deformation map further comprises a multi-scale process comprising resizing the images to a current processing scale of the multi-scale process.

8. The method of claim 7, wherein the multi-scale process further comprises, after resizing images to a current processing scale of the multi-scale process, optimizing parameters for the resized images, applying the camera response function, and deforming the resized images.

9. The method of claim 8, wherein the multi-scale process further comprises updating the deformation map in accordance with an error histogram.

10. The method of claim 1, wherein identifying the plurality of image pairs from the set of images comprises:
identifying image pairs having an overlap that exceeds an overlap threshold, having a sequential proximity in an image series satisfying a proximity threshold, and/or having estimated image capture attitudes within an attitude threshold.

11. A system comprising:

a processor; and a local memory operable to store a plurality of machine-readable instructions which when executed by the processor are operable to cause the system to perform steps comprising:

identifying a plurality of image pairs from a set of images, each image pair comprising a first image selected from the set of images and a second image selected from the set of images that satisfies image registration criteria with the first image;

determining, separately for each of the image pairs, a normalized camera response function for each of the images in the image pair;

generating an optimized normalized camera response function for each image of the set of images by optimizing the normalized camera response functions determined for two or more image pairs that include the image; and applying, for each image in the set of images, the optimized normalized camera response function.

12. The system of claim 11, wherein the plurality of image pairs are infrared images.

13. The system of claim 11, wherein the plurality of machine-readable instructions, when executed by the processor, are further operable to cause the system to perform steps comprising:

normalizing a dynamic range of each of the plurality of image pairs.

14. The system of claim 11, wherein the plurality of machine-readable instructions, when executed by the processor, are further operable to cause the system to perform steps comprising:

applying at least one lens distortion parameter corresponding to components of an image capture device to each image of the set of images.

15. The system of claim 11, wherein the plurality of machine-readable instructions, when executed by the processor, are further operable to cause the system to perform steps comprising:

demixing each of the plurality of image pairs to remove low-frequency non-uniformity.

16. The system of claim 11, wherein the plurality of machine-readable instructions, when executed by the processor, are further operable to cause the system to perform steps comprising:

creating a deformation map using registration parameters, wherein the deformation map is used to align the second image with the first image.

17. The system of claim 16, wherein creating the deformation map further comprises a multi-scale process comprising resizing the images to a current processing scale of the multi-scale process.

18. The system of claim 17, wherein the multi-scale process further comprises, after resizing the images to the current processing scale of the multi-scale process, optimizing parameters for the resized images, applying the corresponding camera response function, and deforming the resized images.

19. The system of claim 18, wherein the multi-scale process further comprises updating the deformation map in accordance with an error histogram.

20. The system of claim 11, wherein selecting the plurality of image pairs from the set of images comprises identifying image pairs having an overlap that exceeds an overlap threshold, having a sequential proximity in an image series satisfying a proximity threshold, and/or having estimated image capture attitudes within an attitude threshold.

* * * * *